Aug. 17, 1965     H. J. CALHOUN     3,201,651
DISTANCE RELAYING ASSEMBLY
Filed July 2, 1962     2 Sheets-Sheet 1

WITNESSES
INVENTOR
Howard J. Calhoun
BY
ATTORNEY

Aug. 17, 1965 H. J. CALHOUN 3,201,651
DISTANCE RELAYING ASSEMBLY
Filed July 2, 1962 2 Sheets-Sheet 2

United States Patent Office 3,201,651
Patented Aug. 17, 1965

3,201,651
DISTANCE RELAYING ASSEMBLY
Howard J. Calhoun, Savreville, N.J., assignor to Westinghouse Electric Corporation, East Pittsburgh, Pa., a corporation of Pennsylvania
Filed July 2, 1962, Ser. No. 206,904
12 Claims. (Cl. 317—36)

This invention relates to distance relaying assemblies and it has particular relation to distance relaying assemblies arranged for zone operation.

A modern distance relaying assembly is discussed in three papers entitled "Compensator Distance Relaying" which appeared in the June, 1958 issue of the American Institute of Electrical Engineers Transactions, Power Apparatus and Systems, published by the American Institute of Electrical Engineers, New York City, papers 58–26, 20 and 19. These papers discuss a relaying assembly wherein three zone relay units provide protection for a transmission line. If a fault occurs in a first zone of the transmission line, the relay unit for the first zone operates promptly to trip a circuit breaker located at the relaying station. If a fault occurs in a second zone of the transmission line which is beyond the reach of the first zone relay unit, a second zone relay unit becomes effective after the expiration of a time delay for the purpose of tripping the circuit breaker. Similarly, if a fault occurs on a third zone of the transmission line beyond the reach of the relay unit for the second zone, a relay unit provided for the third zone becomes effective after the expiration of a further time delay to trip the circuit breaker.

In accordance with the invention, a distance relaying assembly employs a basic or common relay unit which may be adjusted to respond to a fault occuring in any of the three zones of a transmission line to be protected. Thus, if a fault occurs in the first zone of the transmission line, the relay unit operates a translating unit such as the trip coil of a circuit breaker promptly. If a fault occurs in a second zone of the transmission line which is outside the first zone, a timing unit is energized. Upon expiration of a time interval, the relay unit is adjusted to respond to faults occurring in the second zone. Similarly, if a fault occurs in a third zone of the transmission line outside the second zone, a timing unit is energized. After the expiration of a time interval larger than that employed for a second zone operation, the relay unit is adjusted to respond to faults occurring in the third zone. Preferably the relay unit is of static construction.

In a preferred embodiment of the invention, the timer unit is of static construction and is energized from the same source employed for energizing the relay unit. In one embodiment of the invention, the timing unit may respond to a timing interval which varies as a function of the distance of the fault from the relaying station. In another embodiment of the invention, the timing unit measures a constant time interval for a fault occurring at any position within one of the zones.

It is, therefore, an object of the invention to provide a distance relaying unit of improved static construction.

It is another object of the invention to provide an improved distance relaying assembly wherein a common relay unit has its reach automatically adjusted under predetermined conditions.

It is an additional object of the invention to provide a distance relaying assembly wherein a timing unit modifies the reach of a distance relay unit upon expiration of a time interval.

Other objects of the invention will be apparent from the following description taken in conjunction with the accompanying drawings in which.

Figure 1:
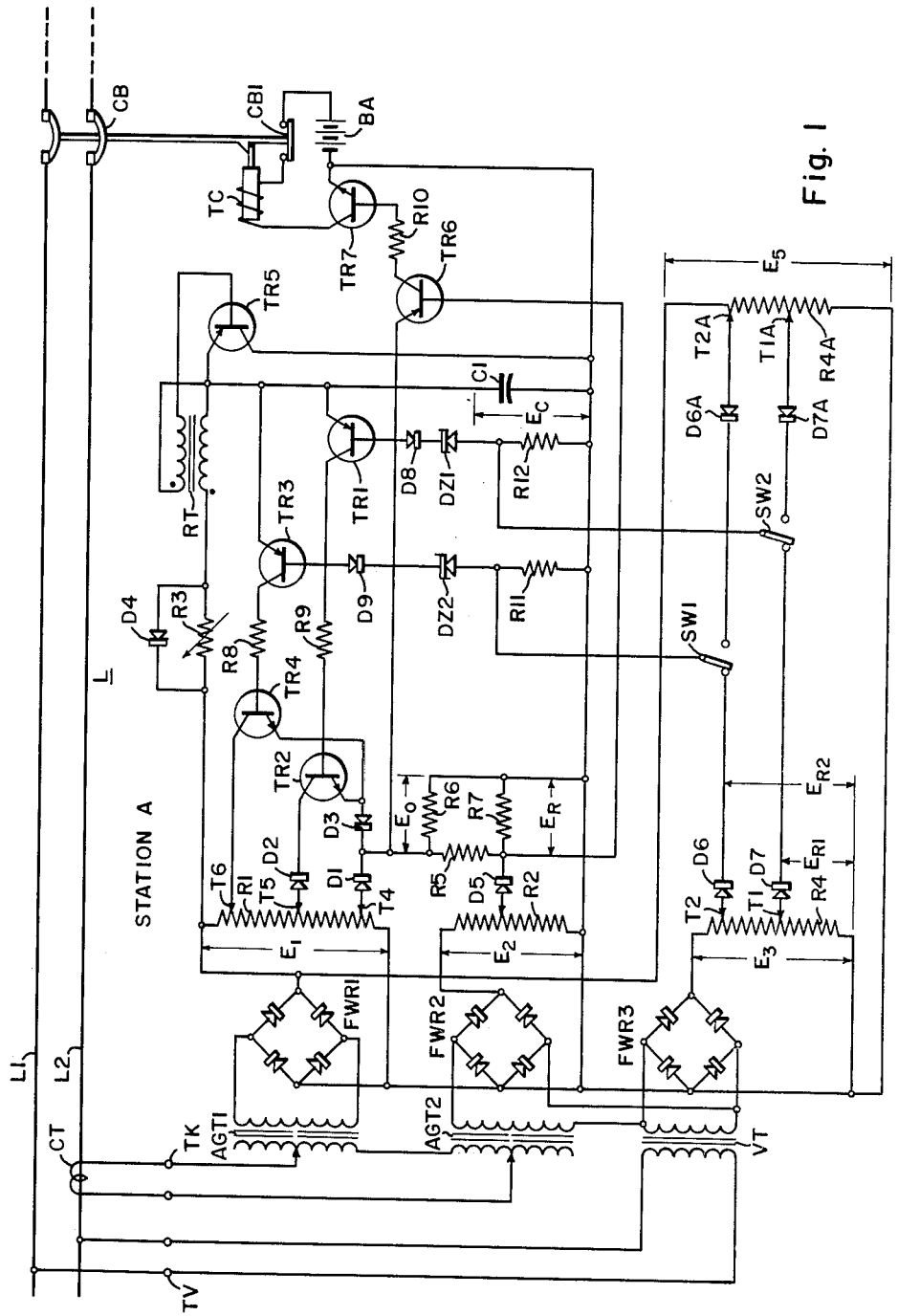
FIGURE 1 is a schematic view of a distance relaying assembly embodying the invention.

Referring to the drawings, FIG. 1 shows an electrical system to be protected. Although the system may be a polyphase system, it will be assumed for present purposes that the system is a single phase alternating current system having line conductors L1 and L2 and operating at a power frequency such as 60 cycles per second. FIG. 1 shows equipment located at a relaying station A. This equipment includes a circuit breaker CB which is employed for controlling the connection of the portions of the line conductors L1 and L2 at the station A to the portions of the line conductors located to the right of the circuit breaker as viewed in FIG. 1. The circuit breaker CB is shown in its closed condition and has a trip coil TC associated therewith which may be energized to trip the circuit breaker. The circuit breaker also has an auxiliary switch CB1 which is closed when the circuit breaker is in closed condition and which is open when the circuit breaker is in open condition.

The relaying assembly located at the station A is energized through pairs of input terminals TV and TK. The two input terminals TV are connected respectively to the line conductors L1 and L2 for energization in accordance with the voltage across the line conductors. The two input terminals TK are connected to the terminals of the secondary winding of a current transformer CT for energization in accordance with current flowing in the line conductor L2.

Operation of the relaying assembly may be employed in any suitable manner such as to operate signals or alarms. In the preferred embodiment of FIG. 1, operation of the relaying assembly is employed for tripping the circuit breaker CB by energization of the trip coil TC. In order to trip the circuit breaker, a direct operation voltage $E_0$ is developed across a resistor R6. For the purpose of restraining a tripping operation of the circuit breaker, a direct restraining voltage $E_R$ is developed across a resistor R7. The difference between these two voltages appears across a resistor R5.

The trip coil TC is so connected to the resistor R5 that the trip coil TC is energized to trip the circuit breaker CB only when the operating voltage $E_0$ exceeds the restraining voltage $E_R$. In the specific embodiment of FIG. 1, the voltage appearing across the resistor R5 is applied across the emitter and base of a transistor TR6 assumed to be of the P-N-P type. As long as the restraining voltage $E_R$ exceeds the operation voltage $E_0$, the resultant voltage across the emitter and base of the transistor TR6 maintains the transistor in its off condition.

When the operating voltage $E_0$ exceeds the restraining voltage $E_R$, the resultant voltage turns on the transistor TR6 and the voltage $E_0$ is applied across the base and emitter of a transistor TR7 through the emitter-collector circuit of the transistor TR6, and a resistor R10. The transistor TR7 is assumed to be of the N-P-N type. The resulting flow of current through the base-emitter circuit of the transistor TR7 turns on this transistor to connect a battery BA through the base-emitter circuit of the transistor TR7 and the auxiliary switch CB1 to the trip coil TC for the purpose of tripping the circuit breaker CB.

The difference between the operating voltage $E_0$ and the restraining voltage $E_R$ depends on the distance between the station A and a fault which occurs on the protected transmission line section. The operating voltage $E_0$ equals the restraining voltage $E_R$ when a fault occurs at a predetermined point on the protected transmission line section. This point is known as the balance point or the reach of the relaying assembly. If the fault occurs at any point beyond the reach of the relaying assembly, the restraining voltage $E_R$ exceeds the operating voltage $E_0$ and the circuit breaker CB remains closed. For any fault located between the balance point and the station A, the operating voltage $E_0$ exceeds the restraining voltage $E_R$ and the circuit breaker CB therefore trips to disconnect the protected line section from the station A.

The resistor R6 is connected for energization in accordance with the voltage across a selected portion of a resistor R1 which has a direct voltage $E_1$ thereacross. The resistor R1 is connected for energization from the secondary winding of a transformer AGT1 through a full wave rectifier FWR1 which is shown to be of the bridge type. If desired, the rectifier may include a conventional filter for smoothing the direct current output of the rectifier. The transformer AGT1 has an adjustable primary winding connected in series with the adjustable primary winding of a transformer AGT2 for energization through the terminals TK in accordance with line current flowing in the conductor L2. The transformer AGT1 has a soft iron core which desirably may be provided with an air gap. If desired, the transformer AGT1 may be designed to saturate for extremely high values of line current in order to limit the maximum voltage $E_1$ appearing across the resistor R1. It will be understood that over a substantial operating range of the relaying assembly, the voltage $E_1$ varies in magnitude in dependence on the magnitude of the line current flowing in the line conductor L2.

The voltage appearing between the lower terminal of the resistor R1 and an adjustable tap T4 is applied across the resistor R6 through a rectifier D1. However, the ratio of the voltage $E_1$ to the operating voltage $E_0$ may be varied by operation of one or more switches such as switches TR2 and TR4 which preferably are in the form of transistors. The transistors are assumed to be of the N-P-N type. When the transistor TR2 is turned on, it connects the voltage across the portion of the resistor R1 which is between the lower terminal of the resistor R1 and an adjustable tap T5 across the resistor R6 through a rectifier D2, the collector-emitter circuit of the transistor TR2 and a rectifier D3. This in effect connects the resistor R6 between the lower terminal of the resistor R1 and the tap T5 to energize the resistor R6 by a larger portion of the voltage $E_1$.

When the transistor TR4 turns on, it connects the resistor R6 across the portion of the resistor R1 which lies between the lower terminal of the resistor R1 and an adjustable tap T6 through the collector-emitter circuit of the transistor TR4 and the rectifier D3. For this connection, the operating voltage $E_0$ represents a still larger portion of the voltage $E_1$. When the transistor TR2 turns on, it in effect extends the reach of the relaying assembly to provide protection for the second zone of the protective line section. When the transistor TR4 turns on, it further increases the reach of the relaying assembly to provide protection for the third zone of the protected line section. The transistors TR2 and TR4 are controlled by a timing device which now will be described.

By inspection of FIG. 1, it will be noted that a capacitor C1 is connected across the resistor R1 through an adjustable resistor R3 and the primary winding of a mutual reactor RT. Consequently, the capacitor C1 charges at a rate dependent on the capacitance of the capacitor, the amount of resistance in the charging circuit of the capacitor and the magnitude of the voltage $E_1$. A rectifier D4 is connected around the resistor R3 to facilitate discharge of the capacitor C1 through the resistor R1. As the capacitor C1 charges, an increasing voltage $E_C$ appears across the terminals of the capacitor.

At the beginning of a timing cycle, the capacitor C1 is discharged through a switch which is represented by a transistor TR5 assumed to be of the P-N-P type. This transistor has its emitter and collector terminals connected across the capacitor C1. The terminals of the secondary winding of the mutual reactor RT are connected respectively to the emitter and base of the transistor TR5. Conventional polarity markings are employed to show suitable polarity relationships for the mutual reactor RT.

When a fault occurs on the transmission line section to be protected, the charging current supplied to the capacitor C1 rapidly increases. The increasing current flowing through the primary winding of the mutual reactor RT induces a voltage pulse in the secondary winding of the mutual reactor which is properly poled to turn on the transistor TR5. The transistor rapidly discharges any charge stored in the capacitor C1.

The current flowing through the primary winding RT rapidly peaks and thereafter starts to decrease. As a result, the transistor TR5 promptly turns off to permit a charging of the capacitor C1 for the purpose of measuring a timing interval. The operation of the mutual reactor is presented in an application of W. K. Sonnemann, Serial No. 166,028, filed January 15, 1962, and assigned to the same assignee.

Timing intervals are measured by comparing the voltage $E_C$ appearing across the capacitor C1 with one or more reference voltages. Assuming that two single-pole double-throw switches SW1 and SW2 are in the positions shown in FIG. 1, two reference voltages $E_{R1}$ and $E_{R2}$ are applied respectively across the resistors R12 and R11.

The reference voltages $E_{R1}$ and $E_{R2}$ constitute selected portions of a direct voltage $E_3$ which is applied across a resistor R4. The resistor R12 is connected across that part of the resistor R4 which lies between an adjustable tap T1 and the lower terminal of the resistor R4 through a rectifier D7. Similarly, the resistor R11 is connected across the portion of the resistor R4 which lies between an adjustable tap T2 and the lower terminal of the resistor R4 through a rectifier D6.

The resistor R4 is connected across the secondary winding of a voltage transformer VT through a full wave rectifier FWR3 which is shown as a bridge type rectifier. If desired, a filter may be associated with the rectifier for the purpose of smoothing the output of the rectifier. The primary winding of the voltage transformer VT is connected for energization through the terminals TV in accordance with the voltage across the line conductors L1 and L2.

The difference between the voltages $E_C$ and $E_{R1}$ is applied across a minimum voltage or threshold device DZ1 through the emitter and base of a transistor TR1 which is assumed to be a P-N-P type transistor and through a rectifier or diode D8. The threshold device DZ1 blocks the flow of current therethrough until the voltage thereacross exceeds a predetermined value. When the voltage exceeds this value, the threshold device breaks over to permit the flow of substantial current through the emitter and base circuit of the transistor TR1 to turn the transistor on. The threshold device DZ1 may be a Zener diode. The rectifier D8 protects the transistor TR1 by preventing flow of current through the emitter and base circuit in the reverse direction.

When the transistor TR1 turns on, the voltage $E_C$ is utilized to turn on the transistor TR2 through a circuit which may be traced from the upper terminal of the capacitor C1 through the emitter-collector circuit of the transistor TR1, a resistor R9, the base-emitter circuit of the transistor TR2, the rectifier D3, and the resistance network comprising the resistors R5, R6 and R7 to the lower terminal of the capacitor C1. Consequently, upon the expiration of a timing interval determined by the comparison of the voltages $E_C$ and $E_{R1}$, the transistor TR2 turns on to increase the reach of the relaying assembly. The relaying assembly now is conditioned for operation as a zone 2 relay.

If the circuit breaker CB fails to trip, the capacitor voltage $E_C$ continues to increase. The difference between this voltage and the reference voltage $E_{R2}$ is applied across a threshold device DZ2 which is similar to the device DZ1 through the emitter-base circuit of a transistor TR3 which is assumed to be a P-N-P type transistor and through a rectifier or diode D9. When the voltage $E_C$ exceeds the voltage $E_{R2}$ by an amount sufficient to break over the Zener diode DZ2, the transistor TR3 turns on. The voltage $E_C$ now is applied to turn on the transistor TR4 through a circuit which may be traced from the upper terminal of the capacitor C1 through the emitter-collector circuit of the transistor TR3, a resistor R8, the base-emitter circuit of the transistor TR4, the rectifier D3 and the resistor network comprising the resistors R5, R6 and R7 to the lower terminal of the capacitor C1.

Inasmuch as it is now turned on the transistor TR4 increases the ratio of the voltage $E_0$ to the voltage $E_1$ and extends the reach of the relaying assembly. The relaying assembly now is suitable for operation as a zone 3 relay.

It is possible to make the voltage $E_R$ proportional to the line voltage appearing between the line conductors L1 and L2. However, it is desirable for many applications to offset the characteristic impedance circle of the relaying assembly in a forward direction. Such offset is produced by the transformer AGT2 which acts as line-current compensator. It will be noted that the secondary windings of the transformers VT and AGT2 are connected in series across the input terminals of a full wave rectifier FWR2. The output terminals of this rectifier are connected across the resistor R2.

Figure 3:
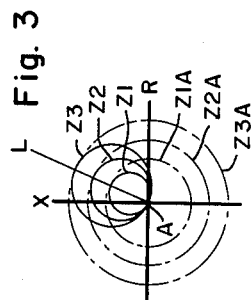
FIG. 3 is a graphical representation showing characteristic impedance circles for relaying assemblies embodying the invention.

The transformer AGT2 introduces a voltage which is dependent on the line current. This voltage is adjusted to offset the impedance circles for the three zones Z1, Z2 and Z3 as shown in FIG. 3 wherein the circles pass through the origin of the coordinate axis representing resistance and reactance of the transmission line. The impedance of the line L is illustrated in FIG. 3 and extends from station A represented by the intersection of the coordinate axis at an angle dependent on the reactance and resistance of the line.

A portion of the direct voltage $E_2$ appearing between the lower terminal of the resistor R2 and a tap T3 is applied across the resistor R7 through a rectifier D5 to establish the restraining voltage $E_R$.

Figure 2:
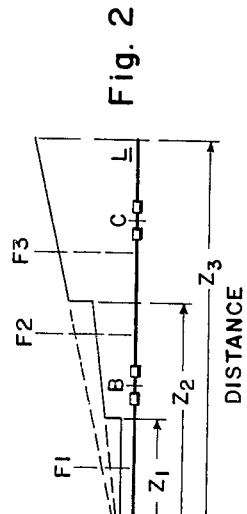
FIG. 2 is a graphical representation showing the zone operation of the relaying assembly of FIG. 1.

The operation of the relaying assembly of FIG. 1 as thus far described now will be considered with reference to FIG. 2. In FIG. 2, abscissas represent distance along the transmission line L from the relaying station A. Additional relaying stations B and C are illustrated and these are similar in structure to the relaying station A.

Let it be assumed that a fault F1 occurs in zone 1 of the transmission line. Inasmuch as this fault is relatively close to station A substantial fault current flows and an operating voltage $E_0$ is produced across the resistor R6 which is larger than the restraining voltage $E_R$. For this reason, the circuit breaker CB is promptly tripped.

Let it be assumed next that a fault F2 occurs on the transmission line in zone 2 and between stations B and C. Because of the distance of this fault from the station A, the impedance of the transmission line between station A and the location of the fault F2 restricts the flow of fault current and the operating voltage $E_0$ is smaller in value than the voltage $E_R$. Consequently, the circuit breaker CB remains closed.

Upon occurrence of the fault F2, a sudden increase in line current produces a pulse in the secondary winding of the mutual reactor RT which turns on the transistor TR5 to discharge the capacitor C1. The current promptly peaks and starts to decrease. For this reason, the transistor TR5 promptly turns off to permit a charging operation of the capacitor C1.

As the capacitor C1 charges, the voltage $E_C$ thereacross increases until it is larger than the reference voltage $E_{R1}$ by an amount sufficient to break down the Zener diode DZ1. This occurs at the intersection of the dotted line representing the fault F2 with the full line curve. The transistors TR1 and TR2 turn on to increase the ratio of the operating voltage $E_0$ to the voltage $E_1$. The voltage $E_0$ now exceeds in value the restraining voltage $E_R$ and the circuit breaker CB consequently is tripped.

If a fault F3 occurs adjacent the station C, a still larger value of line impedance is interposed between the station A and the location of the fault F3. Again the operating voltage $E_0$ is smaller than the restraining voltage $E_R$ and the circuit breaker CB remains closed. The capacitor C1 is discharged through the transistor TR5 and starts to charge in the manner previously described.

When the voltage across the capacitor C1 becomes sufficient to exceed the value of the reference voltage $E_{R1}$ the transistors TR1 and TR2 turn on to increase the ratio of the operating voltage $E_0$ to the voltage $E_1$. However, the voltage $E_0$ still is less than the restraining voltage $E_R$ and the circuit breaker remains closed.

As the capacitor C1 continues to charge the voltage $E_C$ reaches a value greater than the value of the reference voltage $E_{R2}$ by an amount sufficient to break down the Zener diode DZ2. This turns on the transistors TR3 and TR4 to increase further the ratio of the operating voltage $E_0$ to the voltage $E_1$. The operating voltage $E_0$ now is larger than the restraining voltage $E_R$ and the circuit breaker CB consequently trips to clear the fault.

It will be understood that similar relays associated with the stations B and C would operate in an analogous manner to clear a fault.

It will be recalled that the rate of charge of the capacitor C1 and consequently the rate of increase of the voltage $E_C$ is dependent on the magnitude of the line current and that the reference voltages $E_{R1}$ and $E_{R2}$ are dependent on the magnitude of the line voltage. Consequently, as the point of fault moves away from the station A, the rate of charge of the capacitor C1 and the rate of increase of the voltage $E_C$ decreases while the magnitudes of the reference voltages $E_{R1}$ and $E_{R2}$ increase. Consequently, the time required for the relaying assembly to transfer to zone 2 operation or to zone 3 operation increases as the point of fault moves away from the relaying station A. For some applications, it may be desirable to have constant times of transfer from zone 1 to zone 2 or zone 3 operation. Such constant times are shown in FIG. 5, which is prepared on the same coordinates employed for the graphical representation of FIG. 2. A relaying assembly capable of providing the operation represented in FIG. 5 is shown in FIG. 4.

Figure 4:
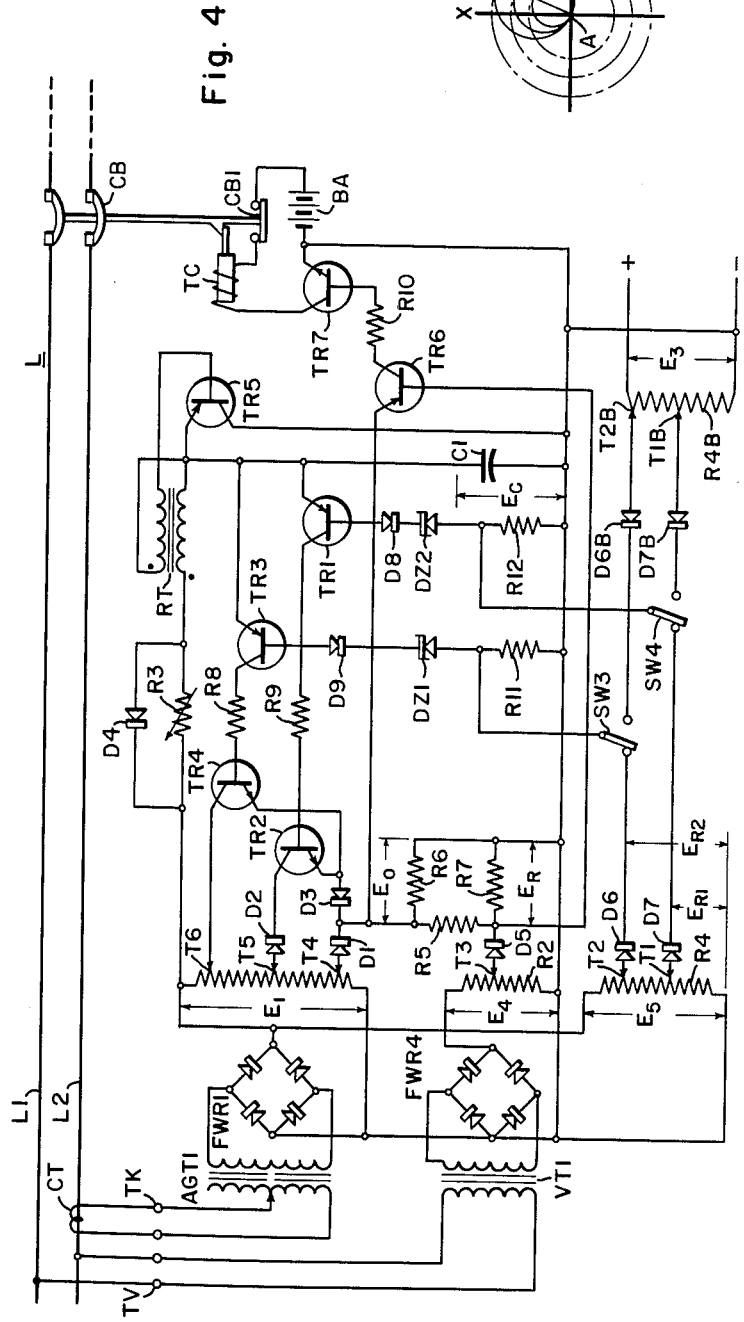
FIG. 4 is a schematic representation of a distance relaying assembly embodying a modified form of the invention; and, FIG. 5 is a graphical representation showing the zone operation of the relaying assembly of FIG. 4.
Figure 5:
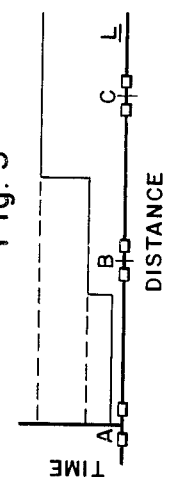

Assuming that the switches SW1 and SW2 of FIG. 1 and similar switches SW3 and SW4 of FIG. 4 are in the positions shown, the only differences between the operating embodiments of FIGS. 1 and 4 reside in the energization of the resistors R2 and R4. In FIG. 1, a voltage $E_3$ is developed across the resistor R4 which varies in dependence on the line voltage. Inasmuch as the reference voltages $E_{R1}$ and $E_{R2}$ depend on line voltage these reference voltages increase as the location of a fault moves away from the relaying station A. Inasmuch as the charging rate of the capacitor C1 and the magnitude of the voltage $E_C$ depends on the line current it follows that the rate of increase of the voltage $E_C$ decreases as the fault location moves away from the relaying station A. For these reasons, the time interval required for the relaying assembly of FIG. 1 to transfer from zone 1 to zone 2 or zone 3 operation increases as the fault location moves away from the relaying station A.

As shown in FIG. 4, the resistor R4 is connected across the output terminals of the rectifier FWR1 to develop a direct voltage $E_5$ across the resistor R4 which is dependent on the line current. Consequently, the reference voltages $E_{R1}$ and $E_{R2}$ also are dependent on line current.

Inasmuch as the voltage $E_C$ and the reference voltages $E_{R1}$ and $E_{R2}$ have magnitudes which vary in dependence on the line current the time interval required to turn on the transistor TR1 or the transistor TR3 following the occurrence of a line fault may be made substantially independent of the location of the fault over a substantial range of operation as disclosed in the copending patent application, Serial No. 208,241, filed July 9, 1962, by Paul Schwanenflugel, and assigned to the same assignee. Thus, the embodiment of FIG. 4 provides the constant time characteristics shown in FIG. 5.

In FIG. 1, the voltage $E_2$ applied across the resistor R2 is dependent on the line voltage compensated by a voltage derived from the line current to produce the offset characteristic circles Z1, Z2 and Z3 of FIG. 3.

In FIG. 4, a direct voltage $E_4$ is applied across a resistor R2 which is dependent only on the line voltage. To this end, the resistor R2 is connected across the input terminals of a full wave rectifier FWR4. The input terminals of the full wave rectifier FWR4 are connected across the secondary winding of a voltage transformer VT1. The primary winding of this transformer is connected to the terminals TV for energization in accordance with the line voltage of the transmission line. Consequently, in the embodiment of FIG. 4 a restraint voltage $E_R$ is developed across the resistor R7 which is dependent on the line voltage of the transmission line. As shown in FIG. 3, the characteristic impedance circles Z1A, Z2A and Z3A for the embodiment of FIG. 4 are concentric with the intersection of the coordinate axes. From the foregoing discussion, it will be understood that the circle Z1A represents the impedance relationships for the embodiment of FIG. 4 being described prior to turn on of the transistors TR1 and TR3. Consequently, the circle Z1A indicates the protection afforded by the embodiment of FIG. 4 for faults occurring in zone 1 of the transmission line.

If a fault is present in zone 2 of the transmission line for a sufficient time, the transistor TR1 turns on to adjust the relaying assembly of FIG. 1 for zone 2 operation. This produces a characteristic circle represented by the circle Z2A of FIG. 3.

In an analogous manner if a fault is present in zone 3 of the transmission line for a time sufficient to turn on the transistor TR3, the relaying assembly of FIG. 4 is adjusted for zone 3 operation as represented by the circle Z3A of FIG. 3.

If the switches SW1 and SW2 are operated to the right as viewed in FIG. 1, the relaying assembly still provides the offset characteristic impedance circles Z1, Z2 and Z3 of FIG. 3. However, the relaying assembly of FIG. 1 now is arranged to provide the step distance characteristics of FIG. 5.

As a result of the operation of the switches SW1 and SW2, the resistor R12 now is connected across that part of a resistor R4A which lies between an adjustable tap T1A and the lower terminal of the resistor R4A through a rectifier D7A. Similarly, the resistor R11 is connected across the portion of the resistor R4A which lies between adjustable tap T2A and the lower terminal of the resistor R4A through a rectifier D6A. The resistor R4A is connected in parallel with the resistor R1 for energization by the voltage $E_5$, which is dependent on line current. Inasmuch as the voltage applied across the resistors R12 and R11 of FIG. 1 now correspond to the reference voltages $E_{R1}$ and $E_{R2}$ of FIG. 4, it follows that the relaying assembly of FIG. 1 now provides the step distance characteristic of FIG. 5, but still provides the offset characteristic impedance circles as previously discussed.

In an analogues manner, the relaying assembly of FIG. 4 may be connected to provide the time-distance characteristics of FIG. 2 while retaining the concentric impedance circle characteristics represented by the circles Z1A, Z1B and Z1C. This is done by operating the switches SW3 and SW4 to the right as viewed in FIG. 4. As a result of the operation of the switches SW3 and SW4, the resistor R12 is connected across that portion of a resistor R4B which lies between an adjustable tap T1B and the lower negative terminal of the resistor R4B through a rectifier D7B. Similarly, the resistor R11 is connected across the portion of resistor R4B which lies between an adjustable tap T2B and the lower terminal of the resistor R4B through a rectifier D6B. The resistor R4B is connected for energization in accordance with the voltage $E_3$ in the same manner by which the resistor R4 of FIG. 1 is energized by the voltage $E_3$.

Inasmuch as the voltages applied across the resistors R12 and R11 of FIG. 4 now correspond to the voltages $E_{R1}$ and $E_{R2}$ of FIG. 1 it follows that the relaying assembly of FIG. 4 now provides the time-distance characteristics of FIG. 2, but still provides the concentric characteristic impedance circles as previously described.

Although the invention has been described with reference to certain specific embodiments thereof, numerous modifications falling within the spirit and scope of the invention are possible.

I claim as my invention:

1. In a protective relay assembly, a first pair of terminals, a second pair of terminals, means for deriving from a voltage applied to said first set of terminals an operating output voltage, means for deriving from a voltage applied to said second set of terminals a restraint output voltage, translating means responsive to the difference between said operating and restraint output voltages, timing means energized from said first pair of terminals for measuring a time interval from a predetermined discontinuity in the energization of said first pair of terminals, and means responsive to operation of said timing means upon expiration of the time intervals for altering the ratio of said operating output voltage to the voltage applied to the corresponding pair of terminals.

2. In a protective relay assembly, a first pair of terminals, a second pair of terminals, means for deriving from a voltage applied to said first set of terminals an operating output voltage, means for deriving from a voltage applied to said second set of terminals a restraint output voltage, switch means having a conducting condition and a non-conducting condition, means responsive to the difference between said operating and restraint output voltages for operating the switch means from one to another of said conditions, timing means energized from said first pair of terminals for measuring a time interval from a predetermined discontinuity in the energization of said first pair of terminals, and means responsive to operation of said timing means upon expiration of the time interval for altering the ratio of one of said output voltages to the voltage applied to the corresponding pair of terminals in a direction increasing the ratio of the operating output voltage to the restraint output voltage.

3. In a protective relay assembly, a static distance relay having input terminals, said distance relay comprising a single distance element having two different reaches, a first adjustment providing the first reach and a second adjustment providing the second reach of the distance element, static electro-responsive timing means energized from said input terminals and responsive to a predetermined change in energization of said input terminals for changing the distance relay from the first adjustment to the second adjustment upon expiration of a substantial time following said predetermined change.

4. In a protective relay assembly, a static distance relay having input terminals, said distance relay comprising a single distance element having two different reaches, a first adjustment providing the first reach and a second adjustment providing the second reach of said distance element, static electro-responsive timing means energized from said input terminals and responsive to a predetermined change in energization of said input terminals for changing the distance relay from the first adjustment to the second adjustment upon expiration of a substantial time following said predetermined change, said substantial time varying as a function of the enrgization of said input terminals.

5. In a protective relay assembly, a first pair of terminals, a second pair of terminals, means for deriving from current supplied to the first pair of terminals a first direct voltage having a magnitude dependent on the magnitude of current flowing through the first pair of terminals, means for deriving from a voltage across said second pair of terminals a second direct voltage having a magnitude dependent on the magnitude of the voltage across the second pair of terminals, energy storage means connected for direct-current energization in accordance with the first direct voltage, timing means responsive to the difference between a voltage representative of energy stored in the energy storage means and the second direct voltage, translating means comprising a switch dependent on the difference between current supplied to said first pair of terminals and voltage supplied across the second pair of terminals, and means responsive to operation of said timing means for altering the response of said switch to the last-named difference.

6. In a protective relay assembly, a first pair of terminals, a second pair of terminals, means for deriving from a voltage applied to said first set of terminals an operating output voltage, means for deriving from a voltage applied to said second set of terminals a restraint output voltage, translating means responsive to the difference between said operating and restraint output voltages, timing means energized from said first pair of terminals for measuring a time interval starting from a predetermined discontinuity in the energization of said first pair of terminals, said timing means comprising a capacitor, a resistive circuit connecting said capacitor for energization in accordance with voltage applied to one of said pairs of terminals, means for deriving from one of said pairs of terminals a reference voltage, and means responsive to the difference between the voltage across said capacitor and said reference voltage, and means responsive to operation of said timing means upon expiration of the time interval for altering the ratio of said operating output voltage to the voltage applied to the corresponding pair of terminals.

7. In a protective relay assembly, a first pair of terminals, a second pair of terminals, means for deriving from a voltage applied to said first set of terminals an operating output voltage, means for deriving from a voltage applied to said second set of terminals a restraint output voltage, translating means responsive to the difference between said operating and restraint output voltages, timing means energized from said first pair of terminals for measuring a time interval starting from a predetermined discontinuity in the energization of said first pair of terminals, said timing means comprising a capacitor, a resistive circuit connecting said capacitor for energization in accordance with voltage applied to said first pair of terminals, means for deriving from one of said pairs of terminals a reference voltage which varies in dependence on the voltage applied to said first pair of terminals, and means responsive to the difference between the voltage across said capacitor and said reference voltage, and means responsive to operation of said timing means upon expiration of the time interval for altering the ratio of said operating output voltage to the voltage applied to the corresponding pair of terminals.

8. In a protective relay assembly, a first pair of terminals, a second pair of terminals, means for deriving from a voltage applied to said first set of terminals an operating output voltage, means for deriving from a voltage applied to said second set of terminals a restraint output voltage, translating means responsive to the difference between said operating and restraint output voltages, timing means energized from said first pair of terminals for measuring a succession of time intervals starting from a predetermined discontinuity in the energization of said first pair of terminals, and means responsive to operation of said timing means upon expiration of each of the time intervals for altering the ratio of one of said output voltages to the voltage applied to the corresponding pair of terminals in a direction increasing the ratio of the operating output voltage to the restraint voltage.

9. In a protective relay assembly, a first pair of terminals, a second pair of terminals, means for deriving from current supplied to the first pair of terminals a first direct voltage having a magnitude dependent on the magnitude of current flowing through the first pair of terminals, means for deriving from a voltage across said second pair of terminals second and third direct voltages having different magnitudes, a capacitor, circuit means connecting the capacitor for energization in accordance with the first direct voltage, said circuit means including substantial resistance whereby the circuit means and capacitor provide a time-delay circuit, discharge means responsive to a predetermined change in current flowing through said first pair of terminals for substantially discharging said capacitor, first timing means responsive to the difference between the voltage across said capacitor and the second direct voltage, second timing means responsive to the difference between the voltage across the capacitor and the third direct voltage, translating means, means for deriving from the first pair of terminals an operating voltage dependent on the magnitude of current supplied to the first pair of terminals for operating the translating means, means for deriving a restraint voltage dependent on voltage supplied to the second pair of terminals for restraining operation of the translating means, and means responsive to each of two successive operations of said first and second timing means for increasing the ratio of said operating voltage to said restraint voltage.

10. In a protective relay assembly, a first pair of terminals, a second pair of terminals, means for deriving from current supplied to the first pair of terminals a first direct voltage having a magnitude dependent on the magnitude of current flowing through the first pair of terminals, timing means responsive to the first direct voltage for developing an output direct voltage having a magnitude dependent on the magnitude of the first direct voltage and on the time during which said first direct voltage is present, means for deriving from said first and second pairs of terminals a second direct voltage dependent on a joint function of current supplied to the first pair of terminals and voltage supplied to the second pair of terminals, translating means responsive to said first direct voltage, restraining means responsive to the second direct voltage for restraining operation of said translating means, and means responsive to said timing means for increasing the ratio of the response of the translating means to the first direct voltage relative to the restraint of the translating means by said restraining means.

11. A protective relaying assembly designed to be energized in accordance with the alternating voltage and alternating line current of an alternating current transmission line for distance discrimination between faults occurring on the line, comprising a circuit breaker for segregating portions of the line, means for deriving a first direct voltage having a magnitude dependent on the magnitude of the alternating line current, means for deriving a second direct voltage having a magnitude dependent on the magnitude of the alternating voltage, means for deriving from said alternating current an alternating potential difference dependent on such current, means for deriving a third direct voltage dependent on a resultant function of said alternating voltage and said alternating potential difference, translating means responsive for operation to said first direct voltage, restraining means for restraining operation of the translating means in dependence on said third direct voltage, a capacitor unit, resistive circuit means for energizing said capacitor unit in accordance with the first direct voltage to develop a capacitor voltage across the capacitor unit, means responsive to an increasing value of said first direct voltage for substantially discharging said capacitor unit, and means responsive to a first difference between the capacitor voltage and the second direct voltage for increasing the ratio of the effect on said translating means of the first direct voltage to the effect on said translating means of the third direct voltage, said translating means comprising tripping means effective in response to operation of the translating means for tripping the circuit breaker.

12. A protective relaying assembly designed to be energized in accordance with the alternating voltage and alternating line current of an alternating current transmission line for distance discrimination between faults occurring on the line, comprising a circuit breaker for segregating portions of the line, means for deriving a first direct voltage having a magnitude dependent on the magnitude of the alternating line current, means for deriving a second direct voltage having a magnitude dependent on the magnitude of the alternating voltage, means for deriving from said alternating current an alternating potential difference dependent on such current, means for deriving a third direct voltage dependent on a resultant function of said alternating voltage and said alternating potential difference, translating means responsive for operation to said first direct voltage, restraining means for restraining operation of the translating means in dependence on said third direct voltage, a capacitor unit, resistive circuit means for energizing said capacitor unit in accordance with the first direct voltage to develop a capacitor voltage across the capacitor unit, means responsive to an increasing value of said first direct voltage for substantially discharging said capacitor unit, and means responsive to a first difference between the capacitor voltage and the second direct voltage for increasing the ratio of the effect on said translating means of the first direct voltage to the effect on said translating means of the third direct voltage, said translating means comprising tripping means effective in response to operation of the translating means for tripping the circuit breaker, and means responsive to a second difference between the capacitor voltage and the second direct voltage for further increasing said ratio.

References Cited by the Examiner
UNITED STATES PATENTS

| | | | |
|---|---|---|---|
| 2,551,022 | 5/51 | Lerstrup | 317—49 |
| 2,809,330 | 10/57 | Harder | 317—36 |

SAMUEL BERNSTEIN, *Primary Examiner.*